United States Patent [19]
Hector et al.

[11] Patent Number: 5,315,579
[45] Date of Patent: May 24, 1994

[54] RECORDING DISK HUB BOND

[75] Inventors: Wayne M. Hector, Shoreview; Cathleen M. Arsenault, St. Paul, both of Minn.

[73] Assignee: Minnesota Mining and Manufacturing Company, St. Paul, Minn.

[21] Appl. No.: 804,681

[22] Filed: Dec. 11, 1991

[51] Int. Cl.$^5$ .............................................. G11B 3/70
[52] U.S. Cl. ................................. 369/290; 369/288; 360/135; 156/276
[58] Field of Search ............... 369/290, 275.1, 289, 369/282, 272; 360/135, 133; 428/406, 415, 417; 156/276, 293, 295

[56] References Cited

U.S. PATENT DOCUMENTS

| | | | |
|---|---|---|---|
| 3,616,174 | 10/1971 | Atkins | 161/162 |
| 3,655,482 | 4/1972 | Schildkraut et al. | 156/276 |
| 4,521,490 | 6/1985 | Pocius et al. | 428/416 |
| 4,524,181 | 6/1985 | Adam et al. | 525/107 |
| 4,698,715 | 10/1987 | Oishi | 360/133 |
| 4,710,913 | 12/1987 | Matsushima et al. | 369/282 |
| 4,711,798 | 12/1987 | Ueda et al. | 428/65 |
| 4,797,764 | 1/1989 | Doering | 360/135 |
| 4,835,647 | 5/1989 | Chernega et al. | 369/288 |
| 4,892,606 | 1/1990 | Miyazaki et al. | 369/288 |
| 4,900,387 | 2/1990 | Johnson | 156/272.2 |
| 4,911,968 | 3/1990 | Higasihara et al. | 369/282 |
| 4,983,429 | 1/1991 | Takayangai et al. | 428/1 |
| 5,188,875 | 2/1993 | Yamaoka et al. | 369/288 |

FOREIGN PATENT DOCUMENTS 49-30259  8/1974  Japan ................................. 156/276

Primary Examiner—Stuart S. Levy
Assistant Examiner—Kevin M. Watkins
Attorney, Agent, or Firm—Gary L. Griswold; Walter N. Kirn; Eric D. Levinson

[57] ABSTRACT

A hub secured to a substrate having a recording medium with a bond layer having a thickness of less than 1 millimeter. The bond layer bonds the hub with the substrate and includes a cross-linked adhesive with a monolayer of glass spheroids dispersed within the cross-linked adhesive. The bond layer thickness is no less than the effective maximum diameter of the spheroids.

10 Claims, 3 Drawing Sheets

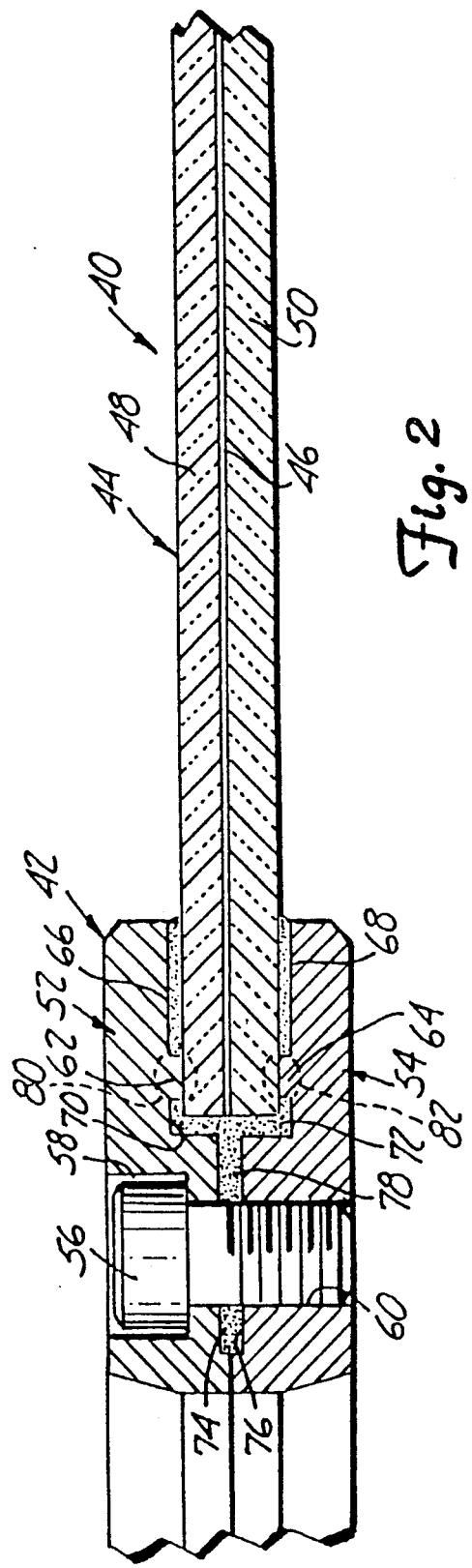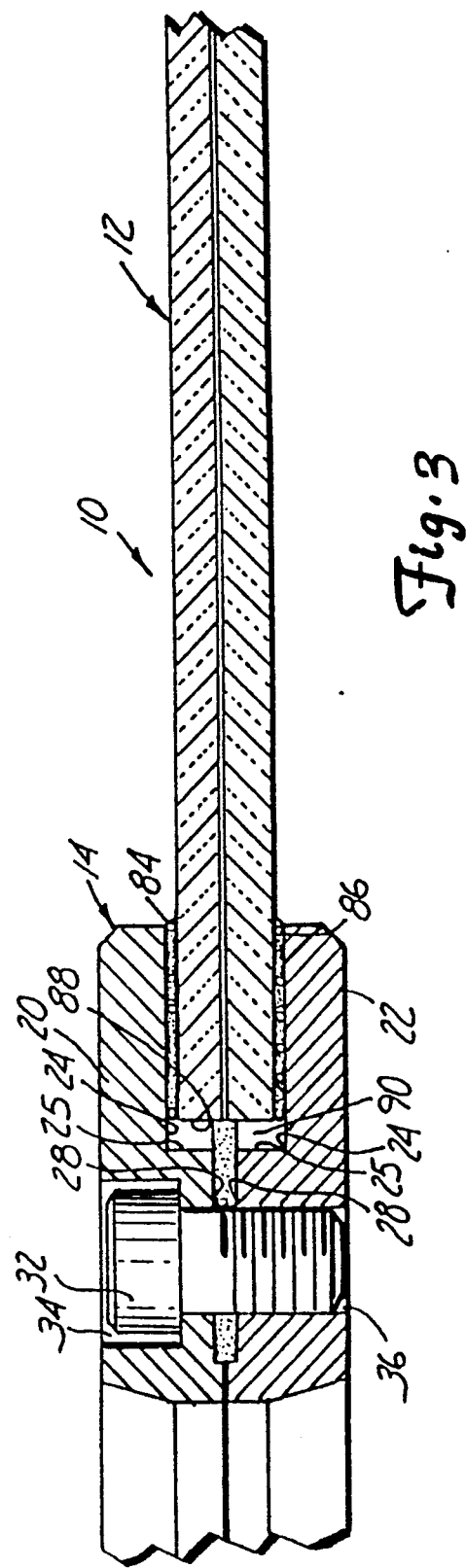

RECORDING DISK HUB BOND

This invention was made with Government support under Contract No. 30602-89-C-0008 awarded by the United States Air Force Rome Air Development Center. The Government has certain rights in the invention.

BACKGROUND OF THE INVENTION

The present invention relates to magnetic, optical, and magneto-optic recording media disks, and in particular, it relates to bonding hubs to disk substrates.

Such recording media disks more generally consist of three elements, a substrate having one or more recording layers, a hub, and an adhesive which secures the substrate to the hub.

Typically, the substrate is made from polymethylmethacrylate, polycarbonate, polyester, aluminum or glass. The magneto-optic layer is deposited through well-known methods of sputtering on to the substrate.

A hub is then applied to the substrate. The hub generally includes a metal centering disk embedded in a polymeric flange. The typical method for attaching the hub to the substrate is to place a ring of polymer film with a pressure-sensitive adhesive coated to both sides between the substrate and the hub to secure the hub to the substrate.

In situations in which optical disks must operate in a wide temperature range, a danger exists that the hub may move relative to information stored on the active layer of the substrate. Such movement, of course, causes problems with storing and retrieving data. Furthermore, a uniform adhesive thickness or "bond line" between the hub and substrate is needed to minimize disk wobble during rotation especially on large diameter disks.

SUMMARY OF THE INVENTION

The present invention includes a recording disk having a substrate with a magnetic, optical or magneto-optic medium bonded to a hub by a bond layer including a cross-linked adhesive and a monolayer of glass spheroids dispersed within the cross-linked adhesive. The bond layer thickness is less than one millimeter and is no less than the effective maximum diameter of the spheroids. The inventive construction facilitates uniform axial spacing of the hub from the recording disk substrate, and results in increased bond strength.

BRIEF DESCRIPTION OF THE DRAWINGS

FIG. 2 is a partial cross-sectional view of a disk design with mechanical spacer ridges 62 and 64 on hub 42 for uniform bond line between the hub and substrate.

FIG. 3 is a partial cross-sectional view of a disk of the present invention.

DETAILED DESCRIPTION OF THE PREFERRED EMBODIMENTS

Figure 1:
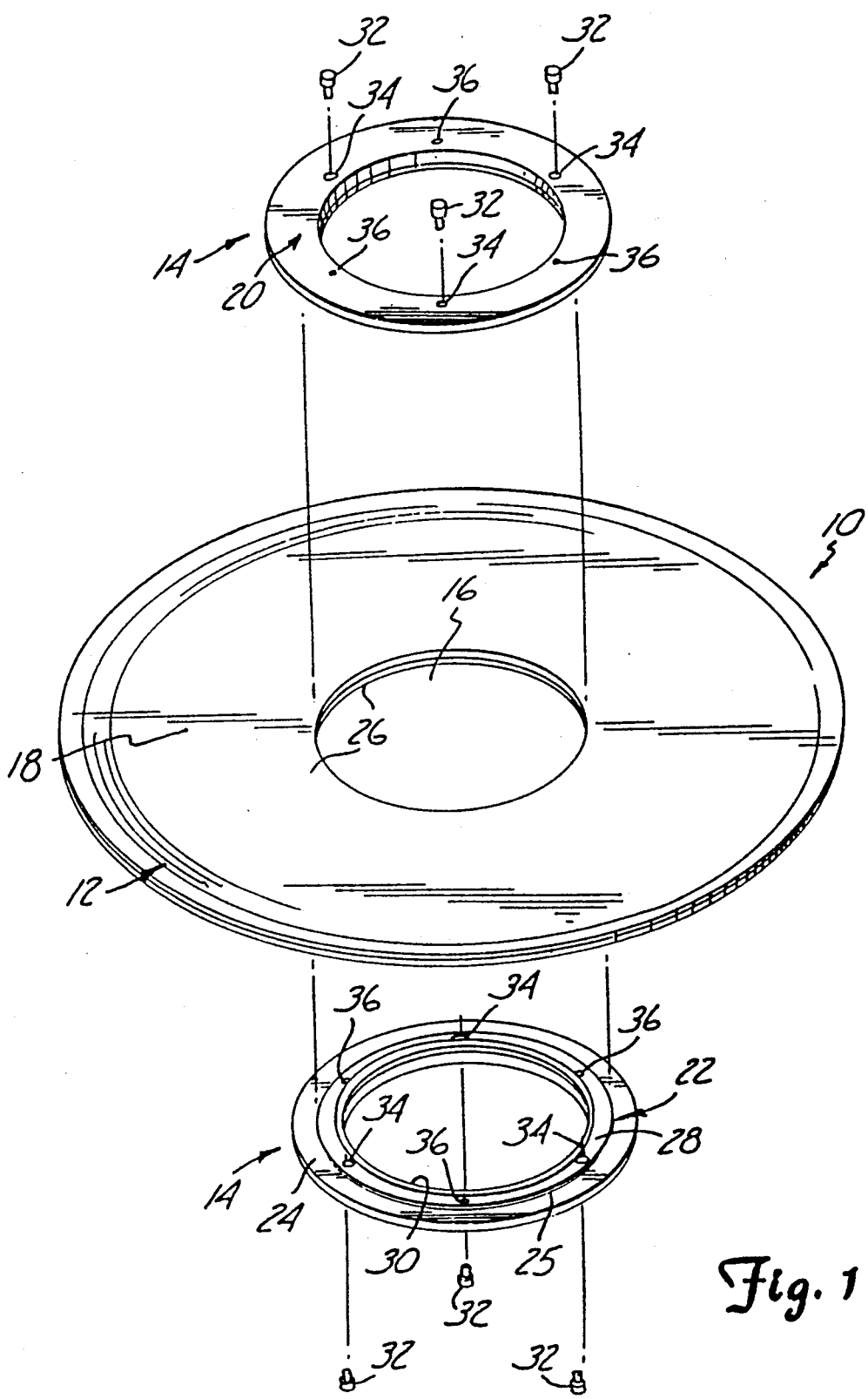
FIG. 1 is an exploded perspective view of a disk within the scope of the present invention.

The disk of the present invention is generally indicated as 10 in FIG. 1. The disk 10 includes a substrate 12 and a hub 14 (in two parts) that is secured to the substrate 12.

The substrate 12 is in the form of a round disk having a centrally disposed opening 16 in FIG. 1. Preferably, the disk includes a substrate layer made of glass, however, other substrates such as polycarbonate may also be used. Other substrates, such as are listed in the Freese et al U.S. Pat. No. 4,569,881, are also within the scope of the present invention. In its preferred embodiment, the substrate 12 is approximately 14 inches (356 mm) in diameter.

The substrate includes a magneto-optic film layer 18. Magneto-optic film layers that are suitable for use in the present invention are well known in the art. Magneto-optic thin film recording media and deposition processes are described in the Freese et al U.S. Pat. No. 4,569,881, and the Gardner U.S. Pat. No. 4,615,944. The magneto-optic film layer preferably includes both read and write capabilities and has an error rate performance equivalent to commercially available magneto-optic films.

Preferably, the substrate is in the form of a double-sided disk, that is, having the capability of recording data on both sides of the disk. Double-sided disks are well known in the art, and can be formed by laminating two substrate layers together with respective magneto-optic film layers disposed thereon.

The hub 14 includes a first hub half 20 and a second hub half 22. Preferably, the hub halves are made of #430 stainless steel. Since both hub halves 20 and 22 are similar, hub half 22 will be described with the understanding that hub half 20 has similar parts. The hub half 22 includes an annular outer flange portion 24 for engaging an inner peripheral top or bottom edge surface portion 26 of the substrate 12. The hub half 22 further includes an annular shoulder 25, an annular mating surface 28, and an inner annular mating surface 30.

The hub halves 20 and 22 are secured to each other, and thereby secured to the substrate 12, by screws 32 extending through apertures 34 in one hub half and threadably engaging apertures 36 in the other hub half. The apertures 34 are disposed along the mating surface 28 and spaced approximately 120 degrees from each other. Likewise, the threaded apertures 36 are disposed along the mating surface 28 at approximately 120 degrees from each other and approximately 60 degrees from adjacent apertures 34 on the same hub half. Three screws 32 are disposed through respective apertures 34 in each hub half 20 and 22 to threadably engage threaded apertures 36 in the other hub half. Aligning the apertures 34 on the hub half 20 with the threaded apertures 36 on the hub half 22 also then aligns the threaded apertures on the hub half 20 with the apertures 34 on the hub half 22.

One earlier version of the recording disk design is generally illustrated at 40 in FIG. 2. The embodiment 40 illustrates a method of adhering a hub 42 to a substrate 44 comprising adhesive layer 46 disposed between and bonding two single-sided magneto-optic disks 48 and 50. The hub 42 includes a first hub half 52 and a second hub half 54 that are secured to each other and to the substrate 44. The hub halves 52 and 54 are in part secured to each other by screws 56 extending through apertures 58 in one hub half and threadably engaging a threaded aperture 60 in the other hub half in a manner similar to the one described previously with reference to the hub halves illustrated in FIG. 1.

Hub halves 52 and 54 include oppositely facing annular spacers or ridges 62 and 64 that directly contact oppositely facing surfaces of the substrate 44. The hub halves 52 and 54 further include recessed annular peripheral surfaces 66 and 68, respectively, disposed on an outer side of the spacers 62 and 64, and inner recessed surfaces 70 and 72 disposed on an inner side of the spacers 62 and 64, all respectively. Each hub half 52 and 54 further includes innermost recessed surfaces 74 and 76 that are disposed inwardly of recessed surfaces 70 and 72. When the hub halves 52 and 54 are joined together, the recessed surfaces 74 and 76, 70 and 72, and 66 and 68 form annular spaces in which an adhesive 78 is inserted to secure the two hub halves 52 and 54 together and to secure the hub halves to the substrate 44. The annular spacers 62 and 64 attempt to provide as uniform a spacing as possible between the substrate and the recessed surfaces so that a uniform adhesive thickness or "bond line" is formed. A uniform bond line is desired so that optimum adhesive strength of the epoxy is obtained.

However, computer modeling studies utilizing finite element analysis predict that high levels of stress occur at areas 80 and 82. Areas 80 and 82 include spacers 62 and 64 and epoxy filled spaces proximate to the spacers. Suitable software for computer modeling is available under the trademark ANSYS from Swanson Analysis Systems, Inc., of Houston, Pa. Utilizing the ANSYS software predicted that high stresses will be present at high temperature extremes (e.g. 77° C.) and to a lesser degree at lower temperature extremes (−57° C.).

As illustrated in FIG. 3, the present invention provides uniform bond lines 84 and 86. The uniform bond lines 84 and 86 are achieved by applying a glass-filled adhesive between the outer flange portion 24 of the hub halves 20 and 22 and the substrate 10. Glass spheres in the adhesive force the substrate and the hub halves in parallel relationship with each other, and eliminate the need for mechanical jigs to ensure a parallel relationship in configurations such as illustrated in FIG. 2.

A non-filled adhesive layer is applied between mating surfaces 28 of the hub halves 20 and 22. No adhesive is applied between an inner peripheral edge 88 of the substrate 10 and the annular shoulders 25 of the hub halves 20 and 22 thereby providing an air gap between the shoulders 25 and the edge 88.

The thickness of bond lines 84 and 86 is generally less than one millimeter. Preferably, the bond layer thickness is between 200 and 350 micrometers. In a preferred embodiment the glass-filled adhesive epoxy includes glass spheres selected to produce a bond layer having a thickness of approximately 250 micrometers (0.010 inches). Glass spheres having a nominal diameter of 200 micrometers (0.008 inches) available from Minnesota Mining and Manufacturing Company of St. Paul, Minn., produced an acceptable bond layer in the approximate range of 250 micrometers (0.010 inches). Although other types of materials in the form of spheres, such as aluminum or ceramic spheres, may be used in the present invention, glass spheres were chosen since they better match the coefficient of thermal expansion of a glass substrate.

Suitable epoxy adhesives for use in the present invention are described in U.S. Pat. No. 4,521,490. One epoxy adhesive used in making this invention was 3M epoxy #EC-3569, which is a two-part adhesive sold by Minnesota Mining and Manufacturing Company of St. Paul, Minn.

To produce the disk of the present invention, 20 parts by weight of a curable epoxy and 10 parts by weight of an accelerator or curative were mixed. Two parts by weight of glass spheres having a nominal diameter of approximately 200 micrometers (0.08 inches) were mixed with the base epoxy and accelerator. The size distribution of the glass spheres was: 5% > 218 micrometers, 50% > 206 micrometers, and 95% > 177 micrometers. Thus, the weight of glass spheres was about 6.7% of the weight of the epoxy mixture. The proportion of spheroids to adhesive needed to maintain good spacing as a monolayer can be readily determined through experimentation.

The glass filled epoxy mixture was spread on to the outer flange portions 24 of the first hub half 20. The same epoxy mixture without glass spheres was then spread on the hub mating surfaces 28 of the first hub half.

In assembly, the second hub half without adhesive is held securely, and the substrate 12 is positioned on the second hub half 22. The first hub half with glass-filled adhesive applied to the outer flange portion 24 is placed in mating relationship with the second hub half. A first set of three screws 32 are then inserted into the three apertures 34 of the second hub half to engage threaded apertures 36 of the first hub half 22.

Prior to tightening of the first set of screws 32, the first hub half 20 is aligned with respect to the substrate using techniques known in the art. Preferably, the substrate 12 is preformatted with tracking grooves prior to assembly. Consequently, the hub halves should be centered with respect to the substrate 12. The centering is done using optical scanning techniques that indicate the formatted area on the substrate in relation to the center of the hub. The spheres in the adhesive glass sphere mixture permit the first hub half to be moved more readily with respect to the substrate while the components are in contact with the uncured adhesive, and in that capacity, they act as ball bearings. Once the centering of the first hub half is completed, the first set of screws is tightened. During tightening, the substrate is aligned parallel to the plane of the hub half 20 due to the glass spheres in the epoxy. After tightening the first set of screws, the epoxy is permitted to cure.

Once the epoxy has cured, the first set of screws 32 retaining the second hub half to the first hub half is removed, and the assembly is turned over so that the first hub half is now on top. An epoxy mixture with glass spheres is then applied to the outer flange portion 24 of the second hub half, and epoxy without glass spheres is then applied to the mating surfaces 28. The first hub half 22 is then placed in mating relationship with the first hub half and the substrate. A second set of screws 32 are then inserted into the apertures 36 of the first hub half to engage the threaded apertures 34 of the second hub half.

The second hub half 22 is then centered with respect to the formatting on the substrate 12 in a manner similar to the one used to center the hub half 20. Again, the glass spheres in the glass filled epoxy mixture act as ball bearings permitting movement of the hub so that the hub can be centered with respect to the formatting of the substrate. Once the hub half 22 has been centered, the second set of screws 32 is then tightened. During tightening, the glass spheres align the second hub half 22 so that its plane is parallel with respect to the plane of the substrate.

The first set of screws 32 is then reinserted to threadably engage the first hub half. It will be appreciated that the screws 32 will come in contact with the epoxy disposed between the mating surfaces 28 and be secured once the epoxy cures.

Once the two hub halves are secured, an air gap 90 is formed between the shoulders 25 and the inner edge 88 of the substrate 12. The air gap 90 serves as a stress relief area.

Since the epoxy mixture is thixotropic, the bond line thickness is normally slightly greater than the nominal diameter of the spheres. The size distribution of the glass filler spheres should be between about 40% and 95% of the desired thickness of the bond layer.

Using the ANSYS finite elements computer program mentioned previously, the predicted maximum equivalent or Von Mises stress values, due to thermal expansion were calculated as ambient temperature is raised from 23° to 77° C. or lowered from 23° to −57° C., for the configuration illustrated in FIG. 2 and the present invention illustrated in FIG. 3. The maximum predicted stress for the present invention was significantly less, as illustrated in Table 1 set forth below.

TABLE 1

| FIG. 2 Design | | FIG. 3 Design | |
|---|---|---|---|
| Component | Equivalent Stress (MPa) | Component | Equivalent Stress (MPa) |
| HUB | 258 | HUB | 53 |
| GLASS SUBSTRATE | 202 | GLASS SUBSTRATE | 68 |
| EPOXY | 45 | EPOXY | 40 |

The adhesive strength of the glass filled epoxy mixture is also increased as compared to epoxy not having glass spheres. Table 2 set forth below illustrates the relative strength of both a lap weld and a butt weld using epoxy without glass spheres and the epoxy with glass spheres of the present invention. Stainless steel test bars of No. 430 stainless steel were adhered to each other in both a lap weld configuration and a butt weld configuration. The samples in Table 2 were clamped in an Instron tester that pulled at a constant rate of 1 mm/min. The yield is defined as the maximum tensile force registered by the Instron tester divided by the original contact surface area of the epoxy layer. As clearly indicated in Table 2, the adhesive strength as determined by an Instron tester was significantly greater with glass-filled epoxy of this invention.

TABLE 2

| EPOXY TYPE | LAP WELD YIELD | BUTT WELD YIELD |
|---|---|---|
| #3569 epoxy (not filled epoxy) | 24 MPa | 19 MPa |
| #3569 epoxy (filled epoxy) | 28 MPa | 24 MPa |

Figure 4:
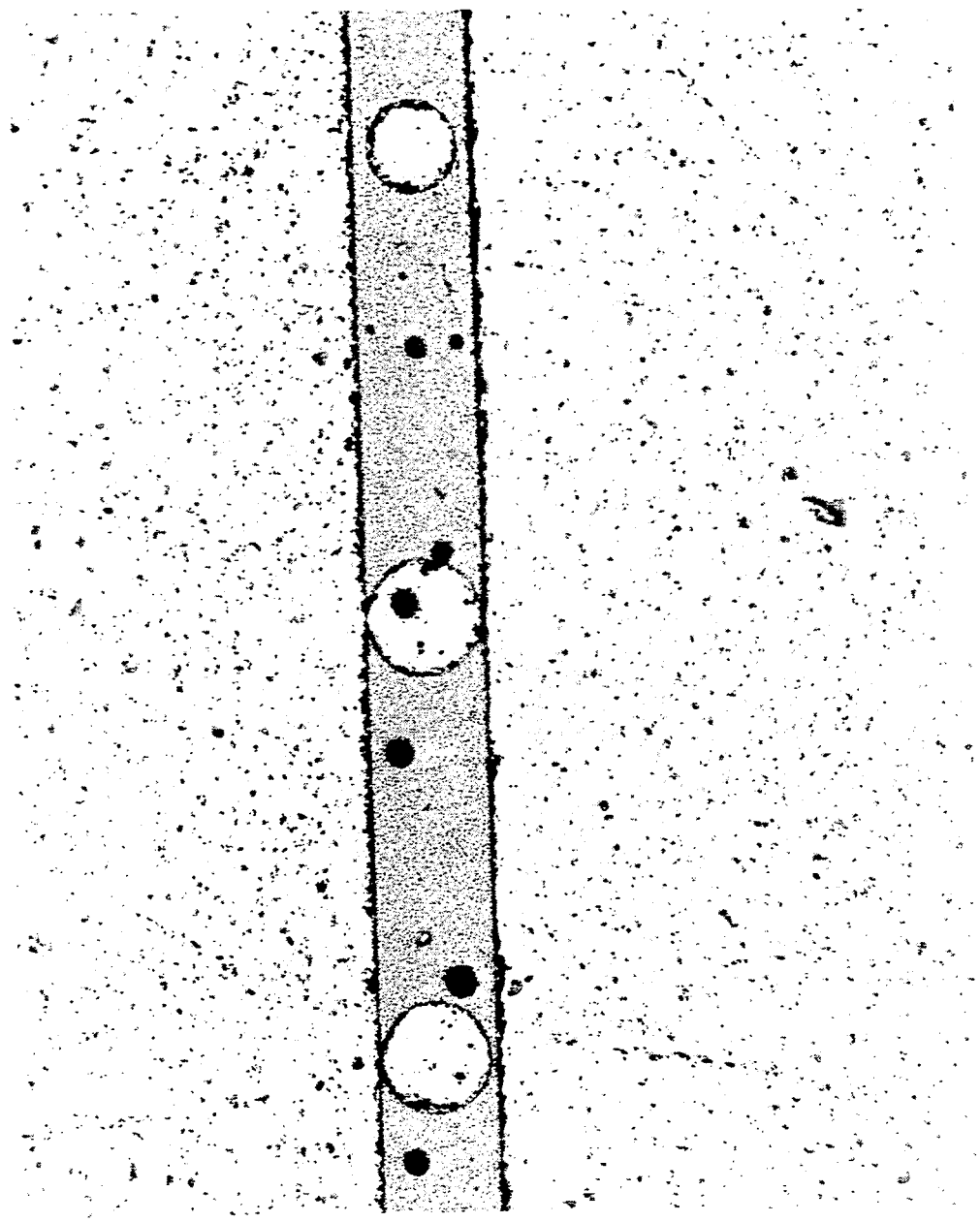
FIG. 4 is a photomicrograph illustrating the bond line thickness of the glass filled epoxy layer of the present invention at a magnification of about 75x on a sample bond between two glass slides.

A photomicrograph illustrating the bond line thickness of the present invention as defined by the glass filled epoxy layer is illustrated in FIG. 4. The photomicrograph of FIG. 4 is of a sample formed between two glass slides.

Although this description refers to magneto-optical disks having a two-part hub, the invention described herein is also applicable to magnetic and optical disks and to recording disks of any type having a one-part hub.

Although the present invention has been described with reference to preferred embodiments, workers skilled in the art will recognize that changes may be made in form and detail without departing from the spirit and scope of the invention.

What is claimed is:
1. An information carrying disk comprising
a substrate with a recording medium thereon;
first and second hub halves, each hub half having an annular outer surface area facing the substrate and an inner annular surface area facing the other hub half;
a bond layer having a thickness of less than one millimeter bonding the outer annular surface area of a hub half to the substrate, the bond layer including a cross-linked adhesive and a monolayer of spheroids dispersed within the adhesive, the spheroids made of a material selected from the group consisting of aluminum, glass and other ceramics, the bond layer thickness being no less than the maximum diameter of the spheroids; and
a cross-linked adhesive disposed between the inner annular surface areas of the hub halves, wherein an air space is positioned between the cross-linked adhesive and the cross-linked adhesive with spheroids and the substrate.

2. The disk of claim 1 wherein the cross-linked adhesive in the bond layer is an epoxy.

3. The disk of claim 1 wherein the bond layer thickness is within the range of from about 200 to 350 micrometers.

4. The disk of claim 2 wherein the spheroids have a coefficient of thermal expansion which approximates that of the substrate.

5. The disk of claim 3 in which the substrate comprises glass.

6. The disk of claim 2 in which the size distribution of the spheroids is between 40% and 95% of the thickness of the bond layer.

7. A method for assembling a recording disk having a hub, and a recording medium disposed on a substrate, wherein the hub includes first and second hub halves, each hub half having an annular outer surface area facing the substrate and an inner annular surface area facing the other hub half, the method comprising:
applying a bonding layer between the outer annular surface area of each hub half and the substrate, the bonding layer including a cross-linkable adhesive and a monolayer of spheroids dispersed within the adhesive, wherein the bonding layer has a thickness of less than 1 millimeter but no less than the maximum diameter of the spheroids;
applying a cross-linkable adhesive between the inner annular surface areas of the hub halves, wherein an air space is positioned between the cross-linkable adhesive and the cross-linkable adhesive with spheroids and the substrate; and curing the adhesives.

8. The method of claim 7 wherein the cross-linkable adhesive in the bonding layer is an epoxy.

9. The method of claim 7 wherein the spheroids have an effective diameter range of from about 200 to 350 micrometers.

10. The method of claim 7 further including applying a selected pressure to the dispersed bonding layer prior to curing such that the bonding layer thickness conforms to the maximum diameter of the spheroids.

* * * * *